Oct. 29, 1946. M. BECHIK Re 22,807

FLEXIBLE MATTRESS HANDLE

Original Filed May 19, 1939 2 Sheets-Sheet 1

Michael Bechik
INVENTOR

BY Howard L. Fischer
ATTORNEY

Oct. 29, 1946. M. BECHIK Re 22,807

FLEXIBLE MATTRESS HANDLE

Original Filed May 19, 1939 2 Sheets-Sheet 2

Michael Bechik
INVENTOR

BY Howard L. Fischer
ATTORNEY

Reissued Oct. 29, 1946

Re. 22,807

UNITED STATES PATENT OFFICE 22,807

FLEXIBLE MATTRESS HANDLE

Michael Bechik, St. Paul, Minn.

Original No. 2,248,328, dated July 8, 1941, Serial No. 274,586, May 19, 1939. Application for reissue October 15, 1941, Serial No. 415,849

6 Claims. (Cl. 16—125)

My invention relates to an improvement in handles, wherein it is desired to provide a detachable handle for mattresses, cushions or the like.

For several years it has been common practice to provide most mattresses manufactured with handles by means of which the mattresses may be easily handled. The mattress handles used have been of various types, but are ordinarily secured in the side wall of the mattress in such a way that the ends of the handle are anchored inside of the mattress wall, or else are anchored to a grommet or rivet extending through the side wall of the mattress. It will be seen that in either event, should the handle become damaged or soiled, it would be impossible to repair the same without opening the mattress up. The opening of the side wall of a mattress is difficult for the ordinary person to do, as most persons are not equipped with suitable machines to sew the mattress up again properly. For this reason, once the handles have become broken, it was necessary to get along without any handle.

The present invention relates to a handle which is provided with anchoring means engageable with a reinforcing means on the inner surface of the mattress wall and which may be detached from the mattress wall if desired and replaced. Thus if the handle becomes damaged, it is possible to remove the broken parts of the same and to insert a new mattress handle into the mattress wall without taking the mattress apart.

It is a purpose of my invention to provide a mattress handle which may be formed of flexible material and which may be provided at each end with anchoring means which may extend through grommets or similar reinforcing means in the wall of the mattress and be anchored on the inner wall surface. With such a construction, the handle may be readily applied after the mattress has been completed, and if the handle becomes damaged or soiled, it may be readily replaced. It is recognized that it may be difficult to remove the anchored ends of the handle through the opening in the mattress wall, but in any event, the old handle may be easily discarded by cutting the handle cord in the center and pushing each end of the handle into the mattress and subsequently inserting a new handle in place.

It is a feature of my invention to provide a flexible handle with anchoring means at each end thereof, to provide spaced grommets through which the reinforced anchoring ends of the handle may extend, and to provide reinforcing means overlying the inner surface of the mattress wall against which said anchoring means may engage so that the pull upon the handle is distributed over a relatively large area.

These and other objects and novel features of my invention will be more clearly and fully set forth in the following specification and claims.

In the drawings forming a part of my specification:

Figure 1:
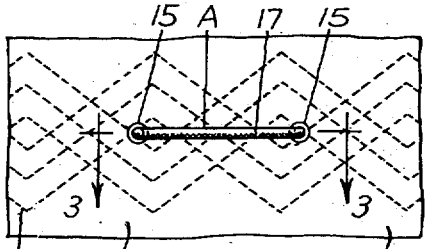
Figure 1 is a front elevational view of the mattress side wall showing the handle in place thereupon.
Figure 2:
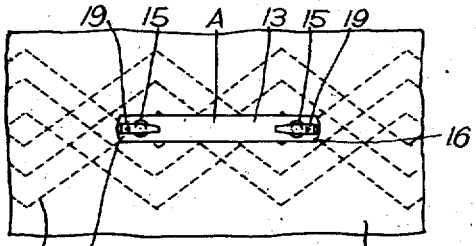
Figure 2 is a rear view of the same mattress side wall showing the portion of the handle embedded within the mattress wall.

The handle A is applied to the side wall 10 of the mattress B. This side wall 10 usually contains padding such as 11 and is quilted by rows of stitching 12 as illustrated in the drawings.

In the construction of the handle A, a resilient reinforcing means such as the strip 13 of spring steel or the like overlies the inner surface of the mattress wall. The spring steel strip is provided with a pair of spaced openings near the end of the same, and grommets 15 extend through the mattress wall 10 and the steel strip 13 through the openings 14 therein to hold the strip 13 firmly overlying the inner surface of the mattress wall.

Figure 3:
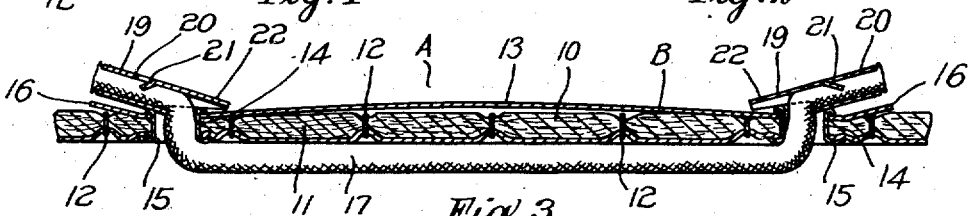
Figure 3 is a cross-sectional view through the mattress wall and handle, the section being indicated by the line 3—3 of Figure 1.
Figure 4:
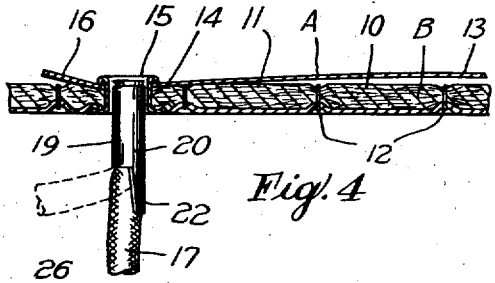
Figure 4 is a detail view of one end of the handle as it is inserted into place through the mattress wall.
Figure 5:
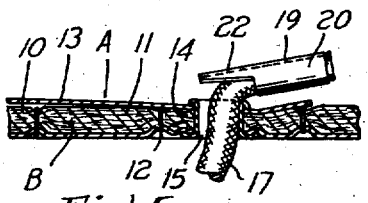
Figure 5 is a view similar to Figure 4, showing the other end of the handle after it has been inserted through the grommet in the mattress wall.

As indicated in Figures 3, 4, and 5 of the drawings, the ends 16 of the spring strip 13 are rounded and are bent inwardly away from the mattress wall 10 at the ends. Thus there is no tendency for the ends of this reinforcing bar to dig into the side wall of the mattress and to injure the same.

A handle cord 17 is provided with an anchoring means 19 at either end of the same to anchor the ends of the handle 17 against the spring strip 13. The anchoring means 19 comprises a tubular member 20 designed to encircle the extreme ends of the handle cord 17 and to be clamped onto these ends. To assist the holding action teeth 21 are punched from the tubular member 20 and extend down into the body of the handle 17 to prevent the ends of the handle from being pulled out of the tubular member 20.

Each of the tubular members 20 are provided with a projecting end 22 which is an extension of a small portion of the tubular member 20 on one end of the same. This extension does not prevent the flexible handle cord 17 from being adjacent the end of the tubular member 20 but does in itself remain straight with respect to the tubular portion so that as the end of the handle is inserted into the grommet and extends through the mattress wall, the projecting portion 20 will engage the inner surface of the mattress wall and will hold the handle end anchored in place.

Figure 6:
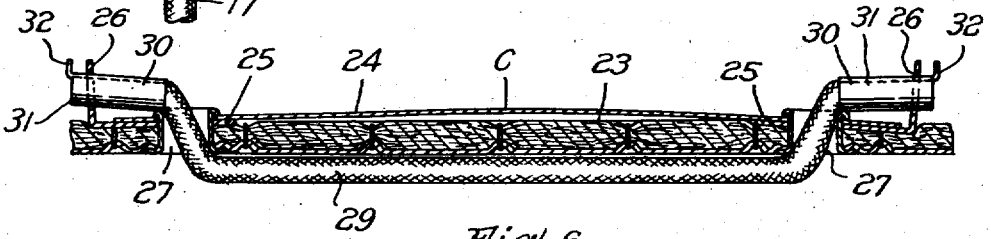
Figure 6 is a sectional view through a modified form of mattress handle construction.

In Figure 6 of the drawings I disclose a handle C which is secured to the mattress wall 23. The wall 23 has a flexible steel spring 24 overlying the inner surface of the same and reinforcing plates 25 which are interposed between the ends of the spring bar 24 and the wall of the mattress at each end of the bar. The plates 25 are L-shaped and are provided with an opening 26 through the upstanding portion of the same. Grommets 27 extend through the mattress wall 23 and through aligned openings in the reinforcing plates 25 and the ends of the spring bar 24 to hold these elements in proper relationship.

Figure 7:
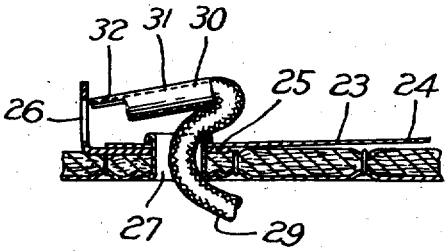
Figure 7 illustrates the manner in which the handle end of the handle illustrated in Figure 6 is inserted in place.

The handle cord 29 is provided with reinforcing ends 30 which comprise a cylindrical portion 31 and a projecting tip end 32. In inserting the handle in place, it is necessary to pull the handle cord 29 through the grommet 27 sufficiently to slip the projecting end 32 of the handle through the opening 26 in the reinforcing plate 25. This procedure is illustrated in Figure 7 of the drawings. If the handle is applied while the mattress wall is open, the projecting end 32 may be bent outwardly as illustrated in Figure 6 of the drawings. Even without this upward extension of the projecting end 32, however, the reinforcing member 31 is of such a length that it would be virtually impossible that this reinforcing tip 30 slip out of the hole 26 accidentally.

Figure 8:
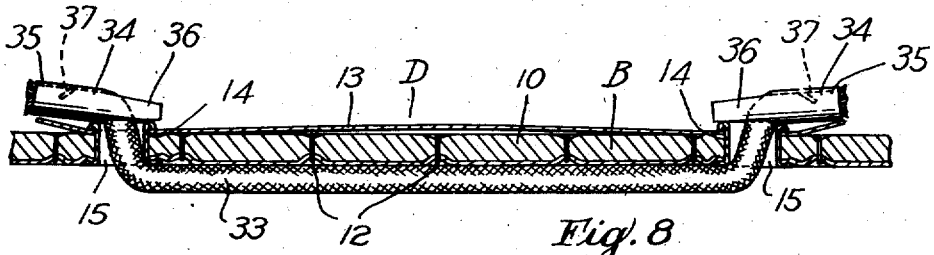
Figure 8 is a sectional view through a modified form of handle construction.
Figure 9:
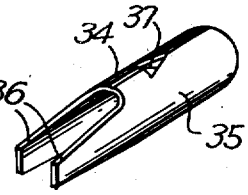
Figure 9 is a perspective view of the anchoring means used in the handle of Figure 8.

In Figures 8 and 9 of the drawings, I disclose a modified form of handle D. In this construction the mattress wall is identical in every detail to that illustrated in Figures 1 through 5 inclusive, and accordingly, the mattress and wall have been given similar numerals. Spaced grommets 15 extend through the wall 10 and through spaced openings 14 in the spring steel bar 13.

The handle cord 33 used in the handle D is provided at each end with a reinforcing tip 34 of the type illustrated in Figure 9 of the drawings. The anchoring tip 34 is provided with a tubular portion 35 having on diametrically opposed sides projecting arms 36. A tooth 37 is bent from the tubular portion 34 and projects into the body of the handle 33 to prevent the handle from pulling out.

The handle D is assembled by inserting one end of the handle cord 33, containing the reinforcing anchoring tip 34 thereupon through one of the grommets 15. After the reinforcing member has been inserted through the grommet, the cord is bent so that the spaced arms 36 engage the surface of the grommet 15 and prevent the end of the handle cord 33 from pulling back out through the grommet. The opposite end of the handle is then inserted in the other grommet 15 in a similar manner, the spring strip 13 being flexed to bring the grommets sufficiently close together to permit this operation to take place. The handle D may be readily assembled after the mattress has been completed, or new handle cords such as 33 may be applied after completion of the remainder of the assembly.

Figure 10:
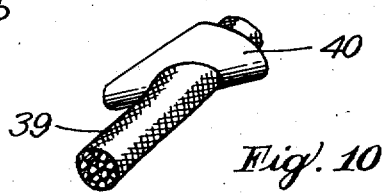
Figure 10 is a perspective view of a handle end and a modified form of anchoring member.
Figure 11:
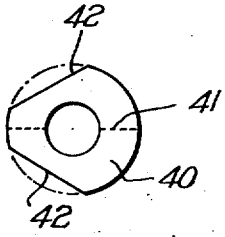
Figure 11 is a view of the anchoring member disclosed in Figure 10 before the same has been bent.
Figure 12:
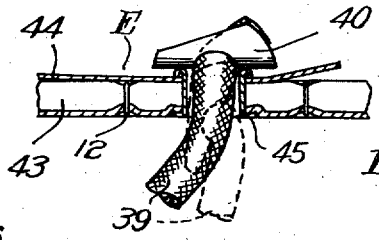
Figure 12 illustrates the manner in which the anchoring means of Figures 10 and 11 operate to anchor the handle.

In Figures 10, 11, and 12 of the drawings, I disclose a handle construction E which is slightly modified from the form illustrated in Figure 8. In this form of construction the handle cord 39 has clamped adjacent each end thereof a washer 40. This washer 40 as best illustrated in Figure 11 of the drawings is folded along a fold line 41 through the center of the washer and is cut or ground along a line such as 42 on each side of the fold line 41 to make the washer considerably thinner than usual. The washer 40 is applied to the handle cord 39 by merely folding the washer along the fold line 41, thus clamping the end of the handle cord between the sides of the washer.

The washer 40 forms the anchoring means for the ends of the handle cord 39. In Figure 12 of the drawings, I disclose a mattress wall 43 having a spring bar 44 overlying the inner surface of the same and having grommets 45 extending through the mattress wall and the spring bar 44. As illustrated in dotted outline, the washer 40 and the attached handle 39 are slipped through the grommet 45. When once the washer 40 has slipped through the grommet 45, the washer engages over the inner surface of the grommet 45 crossways and prevents the handle cord 39 from being pulled out. In other words, similar to the other constructions, the washer 40 will pass through the grommet 45 in a longitudinal direction, but when turned crossways in its natural position, will act to anchor the end of the core 39.

Figure 13:
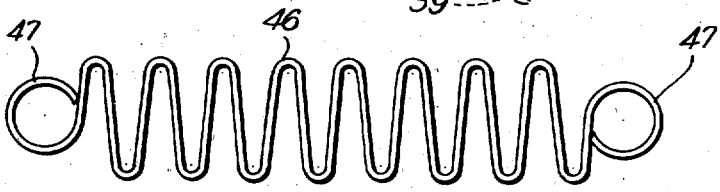
Figure 13 illustrates a resilient reinforcing member which may be used on the inner surface of the mattress wall.
Figure 14:
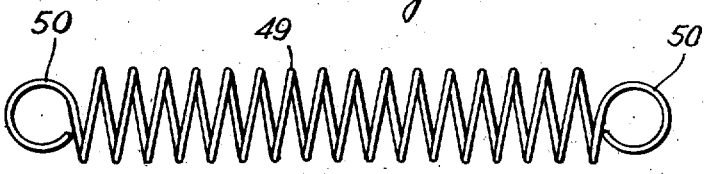
Figure 14 illustrates a modified form of resilient reinforcing means for use in place of the construction of Figure 13.

In Figures 13 and 14 of the drawings, I disclose different types of resilient bars which may be used in place of the spring strip such as 13 or 24. In Figure 13 of the drawings, I disclose a flat wire spring 46 which lies flat against the inner surface of the mattress wall and which is provided with loops 47 on opposite ends of the same through which securing grommets may be inserted. In Figure 14 of the drawings I disclose a coil spring 49 having flat loop ends 50 through which grommets may be extended. When the springs 46 or 49 are used in place of the spring strip, it is obvious that a reinforcing washer should be used overlying the inner surface of the mattress wall to provide a bearing for the anchoring means used to secure the ends of the handle cord in place. While the springs 46 and 49 have been shown in separate figures, it is understood that these springs could be substituted for either the spring strip 13, 24, or 44 without changing my invention.

In accordance with the patent statutes I have described the principles of construction and operation of my mattress handle; and while I have endeavored to set forth the best embodiments thereof, I desire to have it understood that this is only illustrated of a means of carrying out my invention, and that obvious changes may be made within the scope of the following claims without departing from the spirit of my invention.

I claim:

1. A mattress handle comprising a resilient reinforcing bar designed to overlie the inner surface of a mattress wall, a pair of grommets extending through said bar and said mattress wall to hold said bar to said mattress wall, a flexible handle cord stretched taut by the resilience of said bar overlying the outer surface of the mattress wall between said openings and having ends extending through said openings, and anchoring means on the ends of said flexible handle of elongated form capable of passing through said grommets longitudinally but too long to pass through said grommets transversely.

2. A handle for mattress walls comprising a relatively stiff normally flat flexible reinforcing means overlying the inner surface of the mattress wall, a pair of spaced grommets extending through the mattress wall and said reinforcing means, a flexible handle overlying the outer surface of the mattress wall between said spaced grommets, and means on the ends of said handle detachably anchoring said handle within the mattress wall, said reinforcing means flexing to permit attachment of said handle.

3. A mattress handle for use with a mattress wall comprising a flexible resilient reinforcing means overlying the inner surface of the mattress wall, a pair of spaced grommets extending through the mattress wall and said reinforcing means, a flexible handle stretched taut, by said reinforcing means overlying the outer surface of the mattress wall between said grommets, and anchoring means on the ends of said handle of a shape to pass through said grommets, said anchoring means engaging the inner surface of said grommets to hold the ends of the handle anchored in place, and held firmly against said grommets by said reinforcing means.

4. A mattress handle for use in combination with a mattress wall having a resilient reinforcing means overlying the inner surface thereof, and a pair of spaced reinforced openings through said mattress wall and said reinforcing means, said handle including a flexible cord stretched taut by the resilience of said reinforcing means overlying the outer surface of the mattress wall between said openings and having the ends thereof extended through said reinforced openings, and anchoring means on the ends of said handle cord, said anchoring means including means anchoring said anchoring means to said cord, and a projecting means designed to project beyond said anchoring means and to engage the opposite sides of said reinforced openings to prevent the handle ends from being pulled out of said openings.

5. A handle for mattress walls comprising, a pair of spaced grommets providing openings extending through said mattress wall, a flexible resilient reinforcing means overlying the inner surface of the mattress wall, anchored at its ends to said grommets, a flexible handle overlying the outer surface of the mattress wall between said spaced grommets and means on the ends of said handle designed to engage over said opening on the inside of said mattress wall for detachably anchoring said handle within the mattress wall, said reinforcing means flexing to permit attachment of said handle.

6. The combination with a mattress wall having spaced grommets extended therethrough and provided at their inner ends with bearing surfaces, said wall including flexible resilient reinforcing means for maintaining said wall normally straight but capable of being manually flexed to decrease the distance between said grommets, of a flexible handle overlying the outer surface of said mattress wall between said spaced grommets, self-locking hook-acting anchors on the ends of said handle adapted, when straightened, to be inserted endwise through said grommets and after insertion to turn into engagement against said bearing surfaces, the spacing of said anchors on the ends of said handle being such that the last thereof can be inserted through its cooperating grommet when and only when said wall and its reinforcing means is flexed, whereby said handle is normally maintained taught over said wall.

MICHAEL BECHIK.